(12) United States Patent
Aoki et al.

(10) Patent No.: US 9,321,860 B2
(45) Date of Patent: Apr. 26, 2016

(54) THERMOPLASTIC RESIN

(71) Applicant: MITSUBISHI GAS CHEMICAL COMPANY, INC., Tokyo (JP)

(72) Inventors: Yoshio Aoki, Niigata (JP); Nobuyuki Koike, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/394,892

(22) PCT Filed: Apr. 16, 2013

(86) PCT No.: PCT/JP2013/061233
§ 371 (c)(1),
(2) Date: Oct. 16, 2014

(87) PCT Pub. No.: WO2013/157529
PCT Pub. Date: Oct. 24, 2013

(65) Prior Publication Data
US 2015/0080543 A1    Mar. 19, 2015

(30) Foreign Application Priority Data
Apr. 17, 2012    (JP) ................................ 2012-093694

(51) Int. Cl.
    *C08F 12/08*     (2006.01)
    *C08F 8/04*     (2006.01)
    *C08F 220/18*     (2006.01)

(52) U.S. Cl.
CPC . *C08F 12/08* (2013.01); *C08F 8/04* (2013.01); *C08F 220/18* (2013.01)

(58) Field of Classification Search
CPC .......... C08F 12/08; C08F 8/04; C08F 220/18; C08F 212/08
USPC ............... 526/319, 329.2, 263, 264; 525/204, 525/303, 55
See application file for complete search history.

(56) References Cited

U.S. PATENT DOCUMENTS

| | | | |
|---|---|---|---|
| 5,182,352 A * | 1/1993 | Yamamoto | C08F 220/14 526/329.2 |
| 2006/0205886 A1 | 9/2006 | Yamauchi et al. | |
| 2007/0185277 A1 | 8/2007 | Sugano et al. | |
| 2008/0213606 A1 | 9/2008 | Saegusa | |
| 2011/0244242 A1 * | 10/2011 | Oguro et al. | ................... 428/412 |
| 2011/0269912 A1 | 11/2011 | Kushida et al. | |
| 2011/0297896 A1 | 12/2011 | Kim et al. | |
| 2013/0059980 A1 | 3/2013 | Aoki | |

FOREIGN PATENT DOCUMENTS

| | | |
|---|---|---|
| EP | 0317263 A2 | 5/1989 |
| EP | 1702934 A1 | 9/2006 |
| EP | 1757626 A1 | 2/2007 |
| EP | 2177541 A1 | 4/2010 |
| EP | 2568010 A1 | 3/2013 |
| JP | 63-43910 | 2/1988 |
| JP | 7-68311 | 7/1995 |
| JP | 9-169883 | 6/1997 |
| JP | 2005-206742 | 8/2005 |
| JP | 2005206742 A * | 8/2005 |
| JP | 2006-89713 | 4/2006 |
| JP | 2009-196125 | 9/2009 |
| JP | 2010-211977 | 9/2010 |
| WO | 2010/024217 | 3/2010 |
| WO | 2010/095870 | 8/2010 |
| WO | WO 2011024217 A1 * | 3/2011 |
| WO | 2011/138953 A1 | 11/2011 |

OTHER PUBLICATIONS

Search report from PCT/JP2013/061233, mail date is May 28, 2013.
Extended European Search Report issued with respect to application No. 13777612.6, mail date is Nov. 19, 2015.

* cited by examiner

*Primary Examiner* — Michael M Bernshteyn
(74) *Attorney, Agent, or Firm* — Greenblum & Bernstein, P.L.C.

(57) ABSTRACT

A thermoplastic resin has excellent heat resistance and thermal stability, low water absorption properties, excellent surface hardness and mechanical strength. A thermoplastic resin includes a constituent unit (a) that is derived from a (meth) acrylate monomer and represented by the formula (1); a constituent unit (b) that is derived from a vinyl monomer and represented by the formula (2); and a constituent unit (c) that is derived from a vinyl monomer and represented by the formula (3), and the weight percentage of the constituent unit (a), based on the total weight of the all constituent units, is 60 to 85% by weight, the weight percentage of the constituent unit (b), based on the total weight of the all constituent units, is 5 to 30% by weight, and the weight percentage of the constituent unit (c), based on the total weight of the all constituent units, is 5 to 15% by weight.

8 Claims, No Drawings

THERMOPLASTIC RESIN

FIELD OF THE INVENTION

The present invention relates to a thermoplastic resin having excellent heat resistance, excellent thermal stability, low water absorption properties, excellent surface hardness, and excellent mechanical strength.

BACKGROUND ART

Polymethyl methacrylate (PMMA) and polycarbonate have excellent transparency, and therefore have been widely used in the fields of, for example, optical materials, household appliances, OA machines, and components for automobile. PMMA, however, has a low heat deformation temperature, and is not suitable for uses that require high heat resistance, for example, optical components to be mounted on a car. Further, PMMA has high water absorption so that it is likely to suffer a change in size or a change in refractive index due to absorption of water, and thus PMMA is unsuitable for optical components. On the other hand, polycarbonate has excellent heat resistance and low water absorption properties. However, polycarbonate has a poor surface hardness, and further exhibits large birefringence due to the aromatic rings contained, and therefore the use of polycarbonate as an optical material is limited.

With respect to a resin having excellent heat resistance and excellent transparency, patent documents 1 and 2 have a description about a copolymer of methyl methacrylate, styrene, and α-methylstyrene. However, an α-methylstyrene copolymer has poor thermal stability such that it suffers heat deterioration during molding, causing a lowering of the mechanical strength. Further, in molding of the α-methylstyrene copolymer at a high temperature, decomposition product gas is generated to cause the appearance of the resultant molded article to be poor, and therefore the range of the molding temperatures is restricted.

Patent documents 3 and 4 have a description about a copolymer of methyl methacrylate, N-cyclohexylmaleimide, cyclohexyl methacrylate, and an aromatic vinyl compound (such as styrene or α-methylstyrene). However, when the copolymerization rate of maleimide is increased for improving the heat resistance, the resultant copolymer inevitably suffers discoloration, and therefore this copolymer is not suitable for the uses that require both high heat resistance and excellent transparency.

Patent document 5 has a description of a resin obtained by hydrogenating the aromatic double bonds of polystyrene. Polyvinyl cyclohexane obtained by hydrogenating polystyrene is a resin having excellent transparency and excellent heat resistance; however, the polyvinyl cyclohexane has a disadvantage in that the mechanical strength is poor.

Patent document 6 has a description of a resin obtained by hydrogenating 70% or more of the aromatic double bonds of a copolymer comprising (a) an (meth)acrylate and an aromatic vinyl monomer. This resin has excellent transparency and excellent heat resistance, but, for applying the resin to uses that require high heat resistance, for example, optical components to be mounted on a car, a further improvement of the heat resistance of the resin is needed. Further, in this patent document, as examples of the aromatic vinyl monomers, there are mentioned styrene, α-methylstyrene, and p-hydroxystyrene, but, in the working Examples of the patent document, only styrene is actually used as the aromatic vinyl monomer.

Patent document 7 has a description about a copolymer of methacrylic acid and styrene. In the invention described in this patent document, gel formation is suppressed by adding polyoxyethylene alkyl ether, and, when the copolymerization rate of methacrylic acid is increased for improving the copolymer in heat resistance, gel formation inevitably occurs. A gel causes the optical properties of the copolymer to be poor. Therefore, in the invention described in patent document 7, it is difficult to achieve the copolymer having both excellent optical properties and high heat resistance.

PRIOR ART REFERENCES

Patent Documents

Patent document 1: Japanese Unexamined Patent Publication No. Hei 4-300908
Patent document 2: Japanese Unexamined Patent Publication No. 2005-206742
Patent document 3: Japanese Examined Patent Publication No. Hei 7-68311
Patent document 4: Japanese Unexamined Patent Publication No. Hei 9-169883
Patent document 5: Japanese Unexamined Patent Publication No. Sho 63-43910
Patent document 6: Japanese Unexamined Patent Publication No. 2006-89713
Patent document 7: Japanese Unexamined Patent Publication No. 2010-211977

SUMMARY OF THE INVENTION

Problems to be Solved by the Invention

An object of the present invention is to provide a thermoplastic resin having excellent heat resistance, excellent thermal stability, low water absorption properties, excellent surface hardness, and excellent mechanical strength.

Means to Solve the Problems

The present inventors have conducted extensive and intensive studies with a view toward solving the above-mentioned problems. As a result, it has been found that, by hydrogenating double bonds of a benzene ring in a resin having a specific monomer composition, a thermoplastic resin having excellent heat resistance, excellent thermal stability, low water absorption properties, excellent surface hardness, and excellent mechanical strength can be obtained. Specifically, the present invention is as follows.

1. A thermoplastic resin comprising: a constituent unit (a) that is derived from a (meth)acrylate monomer and represented by the following formula (1):

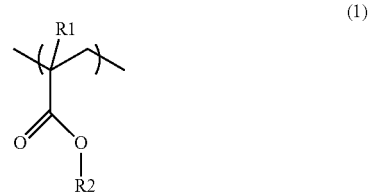

wherein, in the formula (1), R1 represents a hydrogen atom or a methyl group, and R2 represents a hydrocarbon group having 1 to 18 carbon atoms and optionally having a hydroxyl group or an alkoxy group, and when a plurality of the constituent units (a) are present, a plurality of R1s and a plurality of R2s are the same or different;

a constituent unit (b) that is derived from a vinyl monomer and represented by the following formula (2):

(2)

wherein, in the formula (2), R3 represents a phenyl group, a cyclohexadienyl group, a cyclohexenyl group, or a cyclohexyl group, each of which optionally has at least one substituent selected from the group consisting of a hydrocarbon group having 1 to 4 carbon atoms, a hydroxyl group, an alkoxy group, and a halogen atom, and when a plurality of the constituent units (b) are present, a plurality of R3s are the same or different; and a constituent unit (c) that is derived from a vinyl monomer and represented by the following formula (3):

(3)

wherein, in the formula (3), R4 represents a phenyl group, a cyclohexadienyl group, a cyclohexenyl group, or a cyclohexyl group, each of which optionally has a hydrocarbon group having 1 to 4 carbon atoms, and when a plurality of the constituent units (c) are present, a plurality of R4s are the same or different, wherein the proportion of the sum of the number of R3s which are a cyclohexadienyl group, a cyclohexenyl group, or a cyclohexyl group, each optionally having the substituent, and the number of R4s which are a cyclohexadienyl group, a cyclohexenyl group, or a cyclohexyl group, each optionally having the hydrocarbon group, to the total number of all R3s and R4s present in the all constituent units of the thermoplastic resin is 70% or more, and wherein the weight percentage of the constituent unit (a), based on the total weight of the all constituent units, is 60 to 85% by weight, the weight percentage of the constituent unit (b), based on the total weight of the all constituent units, is 5 to 30% by weight, and the weight percentage of the constituent unit (c), based on the total weight of the all constituent units, is 5 to 15% by weight.

2. The thermoplastic resin according to item 1 above, wherein the weight percentage of the constituent unit (a), based on the total weight of the all constituent units, is 60 to 80% by weight, the weight percentage of the constituent unit (b), based on the total weight of the all constituent units, is 7 to 28% by weight, and the weight percentage of the constituent unit (c), based on the total weight of the all constituent units, is 10 to 15% by weight.

3. The thermoplastic resin according to item 1 or 2 above, wherein, in the formula (1) above, each of R1 and R2 is a methyl group.

4. The thermoplastic resin according to any one of items 1 to 3 above, wherein, in the formula (2) above, R3 is a phenyl group, a cyclohexadienyl group, a cyclohexenyl group, or a cyclohexyl group.

5. The thermoplastic resin according to any one of items 1 to 4 above, wherein, in the formula (3) above, R4 is a phenyl group, a cyclohexadienyl group, a cyclohexenyl group, or a cyclohexyl group.

6. The thermoplastic resin according to any one of items 1 to 5 above, which has a glass transition temperature of 125 to 135° C., as determined by the measurement by a differential scanning calorimeter.

7. The thermoplastic resin according to any one of items 1 to 6 above, which has a weight average molecular weight of 100,000 to 250,000.

8. An optical component comprising the thermoplastic resin according to any one of items 1 to 7 above.

Effect of the Invention

In the present invention, a thermoplastic resin having excellent heat resistance, excellent thermal stability, low water absorption properties, excellent surface hardness, and excellent mechanical strength can be obtained. The thermoplastic resin of the present invention is advantageously used in the application of various types of optical components.

MODE FOR CARRYING OUT THE INVENTION

Hereinbelow, the thermoplastic resin of the present invention will be described in detail.

[Thermoplastic Resin]
<Constituent Unit (a)>

As mentioned above, the thermoplastic resin of the present invention comprises constituent unit (a) that is derived from a (meth)acrylate monomer and represented by the formula (1) above. Constituent unit (a) imparts excellent surface hardness to the thermoplastic resin of the present invention, so that the thermoplastic resin achieves excellent scratch resistance.

In the formula (1), R1 represents a hydrogen atom or a methyl group, and R2 represents a hydrocarbon group having 1 to 18 carbon atoms, wherein the hydrocarbon group optionally has a hydroxyl group or an alkoxy group. The number of carbon atoms of the hydrocarbon group is preferably 1 to 12. The number of carbon atoms of the alkoxy group is generally 1 to 14. The number of carbon atoms constituting the alkoxy group is included in the number of carbon atoms in the hydrocarbon group having 1 to 18 carbon atoms.

Specific examples of the hydrocarbon groups include alkyl groups, such as a methyl group, an ethyl group, a butyl group, a lauryl group, a stearyl group, a cyclohexyl group, and an isobornyl group; hydroxyalkyl groups, such as a 2-hydroxyethyl group, a 2-hydroxypropyl group, and a 2-hydroxy-2-methylpropyl group; alkoxyalkyl groups, such as a 2-methoxyethyl group and a 2-ethoxyethyl group; and aryl groups, such as a benzyl group and a phenyl group.

In the thermoplastic resin of the present invention, a plurality of constituent units (a) are generally present. In this case, a plurality of R1s and a plurality of R2s may be the same or different.

From the viewpoint of the heat resistance of the resultant thermoplastic resin and the cost of the production thereof, the above-described constituent unit (a) is preferably a constituent unit derived from a (meth)acrylate monomer, wherein R2 is a methyl group or an ethyl group, more preferably a constituent unit derived from methyl methacrylate, wherein R1 is a methyl group and R2 is a methyl group.

The weight percentage of the above-described constituent unit (a) is 60 to 85% by weight, more preferably 60 to 80% by weight, further preferably 65 to 80% by weight, based on the total weight of the all constituent units in the thermoplastic resin of the present invention (100% by weight). When the weight percentage of constituent unit (a) is less than 60% by weight, the resultant thermoplastic resin is unsatisfactory in the surface hardness. On the other hand, when the weight percentage of constituent unit (a) is more than 85% by weight, the weight percentage of constituent units (b) and (c) is relatively reduced, so that the resultant thermoplastic resin is not only poor in the heat resistance but also increased in the water absorption.

<Constituent Unit (b)>

The thermoplastic resin of the present invention comprises constituent unit (b) that is derived from a vinyl monomer and represented by the formula (2) above. In the production of the thermoplastic resin of the present invention, by copolymerizing a vinyl monomer forming constituent unit (b) in addition to a vinyl monomer forming constituent unit (c), the polymerization of the vinyl monomer forming constituent unit (c) is promoted. The thus produced resin has an increased molecular weight, making it possible to obtain a resin having excellent mechanical strength such that the resin can be subjected to molding for obtaining various optical components which are the application of the thermoplastic resin of the present invention. Further, constituent unit (b) contributes to excellent heat resistance and excellent thermal stability of the thermoplastic resin of the present invention.

In the formula (2), R3 represents a phenyl group, a cyclohexadienyl group, a cyclohexenyl group, or a cyclohexyl group, each of which optionally has at least one substituent selected from the group consisting of a hydrocarbon group having 1 to 4 carbon atoms, a hydroxyl group, an alkoxy group, and a halogen atom. As mentioned below, constituent unit (b) is derived from a styrene vinyl monomer, and the thermoplastic resin is obtained by, with respect to an aromatic copolymer resin obtained by copolymerizing the vinyl monomer with another predetermined monomer, hydrogenating a benzene ring in the vinyl monomer-derived portion (or by hydrogenating a benzene ring in the vinyl monomer and copolymerizing the resultant monomer with another predetermined monomer). In the hydrogenation of the above-mentioned benzene ring, when the hydrogenation has completely proceeded, the benzene ring becomes a cyclohexyl group, and, when the hydrogenation has partially proceeded, the benzene ring becomes a cyclohexenyl group or a cyclohexadienyl group. Alternatively, a case is considered in which no hydrogenation occurs so that the benzene ring remains, that is, the phenyl group remains as such.

Examples of the hydrocarbon groups having 1 to 4 carbon atoms include a methyl group, an ethyl group, a propyl group, an isopropyl group, a butyl group, an isobutyl group, and a tert-butyl group. The number of carbon atoms of the alkoxy group is generally 1 to 4, and specific examples of the alkoxy groups include a methoxy group, an ethoxy group, a propoxy group, an isopropoxy group, a butoxy group, an isobutoxy group, and a tert-butoxy group. Examples of the halogen atoms include F, Cl, Br, and I.

In the thermoplastic resin of the present invention, a plurality of constituent units (b) are generally present. In this case, a plurality of R3s may be the same or different.

From the viewpoint of the cost of the production of the thermoplastic resin, R3 is preferably a group having no substituent, i.e., a phenyl group, a cyclohexadienyl group, a cyclohexenyl group, or a cyclohexyl group.

In the thermoplastic resin of the present invention, the weight percentage of the above-described constituent unit (b) is 5 to 30% by weight, preferably 7 to 28% by weight, based on the total weight of the all constituent units of the resin (100% by weight). When the weight percentage of constituent unit (b) is less than 5% by weight, the resultant thermoplastic resin is poor in the heat resistance. Further, the polymerization reaction is unlikely to proceed so that the molecular weight is not increased, so that the resultant resin is poor in the mechanical strength. On the other hand, when the weight percentage of constituent unit (b) is more than 30% by weight, the resultant thermoplastic resin is unsatisfactory in the surface hardness.

<Constituent Unit (c)>

The thermoplastic resin of the present invention comprises constituent unit (c) that is derived from a vinyl monomer and represented by the formula (3) above. Constituent unit (c) contributes to excellent heat resistance and excellent thermal stability of the thermoplastic resin of the present invention.

In the formula (3), R4 represents a phenyl group, a cyclohexadienyl group, a cyclohexenyl group, or a cyclohexyl group, each of which optionally has a hydrocarbon group having 1 to 4 carbon atoms. Examples of the hydrocarbon groups having 1 to 4 carbon atoms include a methyl group, an ethyl group, a propyl group, an isopropyl group, a butyl group, an isobutyl group, and a tert-butyl group.

As mentioned below, constituent unit (c) is derived from an α-methylstyrene vinyl monomer, and, like the case of constituent unit (b), with respect to an aromatic copolymer resin obtained by copolymerizing the vinyl monomer with another predetermined monomer, a benzene ring in the vinyl monomer-derived portion is hydrogenated (or a benzene ring in the vinyl monomer is hydrogenated and the resultant monomer is copolymerized with another predetermined monomer), so that the benzene ring becomes a cyclohexyl group, a cyclohexenyl group, or a cyclohexadienyl group, or the phenyl group remains as such.

In the thermoplastic resin of the present invention, a plurality of constituent units (c) are generally present. In this case, a plurality of R4s may be the same or different.

From the viewpoint of the cost of the production of the thermoplastic resin, R4 is preferably a group having no substituent, i.e., a phenyl group, a cyclohexadienyl group, a cyclohexenyl group, or a cyclohexyl group.

In the thermoplastic resin of the present invention, the weight percentage of constituent unit (c) is 5 to 15% by weight, preferably 10 to 15% by weight, based on the total weight of the all constituent units constituting the resin (100% by weight). When the weight percentage of constituent unit (c) is less than 5% by weight, the resultant thermoplastic resin is poor in the heat resistance. On the other hand, when the weight percentage of constituent unit (c) is more than 15% by weight, the reaction rate of a vinyl monomer forming constituent unit (c) is reduced during the polymerization for producing the thermoplastic resin of the present invention, so that the resultant thermoplastic resin has a reduced molecular weight, making it impossible to obtain a resin having excellent mechanical strength such that the resin can be subjected to molding for obtaining an optical component.

[Method for Producing the Thermoplastic Resin]

The thermoplastic resin of the present invention can be produced by performing copolymerization of a (meth)acrylate monomer forming constituent unit (a), a vinyl monomer forming constituent unit (b), and a vinyl monomer forming constituent unit (c) and hydrogenation. Hereinafter, the constituent unit before hydrogenation, which corresponds to constituent unit (a), is referred to as "constituent unit (a')", the constituent unit before hydrogenation, which corresponds to constituent unit (b), is referred to as "constituent unit (b')", and the constituent unit before hydrogenation, which corresponds to constituent unit (c), is referred to as "constituent unit (c')".

<(Meth)Acrylate Monomer Forming Constituent Unit (a)>

Examples of (meth)acrylate monomers forming constituent unit (a) (or forming constituent unit (a')) include compounds represented by the following formula (4):

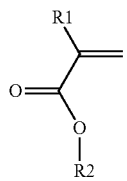

(4)

R1 and R2 are as defined for the formula (1) above.

The (meth)acrylate monomer is preferably one having 4 to 22 carbon atoms. With respect to the (meth)acrylate monomer, there is no particular limitation, and specific examples of the (meth)acrylate monomers include methyl(meth)acrylate, ethyl(meth)acrylate, butyl(meth)acrylate, lauryl(meth)acrylate, stearyl(meth)acrylate, cyclohexyl(meth)acrylate, isobornyl(meth)acrylate, 2-hydroxyethyl(meth)acrylate, 2-hydroxypropyl(meth)acrylate, 2-hydroxy-2-methylpropyl(meth)acrylate, 2-methoxyethyl(meth)acrylate, 2-ethoxyethyl(meth)acrylate, benzyl(meth)acrylate, and phenyl (meth)acrylate. These can be used individually or in combination. Of these, preferred is methyl methacrylate from the viewpoint of the heat resistance of the thermoplastic resin of the present invention and the cost of the production thereof.

<Vinyl Monomer Forming Constituent Unit (b)>

Examples of vinyl monomers forming constituent unit (b) (or forming constituent unit (b')) include compounds represented by the following formula (5):

(5)

R3 is as defined for the formula (2) above, but, from the viewpoint of the copolymerizability during the production of the thermoplastic resin, R3 is especially preferably a phenyl group optionally having a substituent.

Specific examples of vinyl monomers forming constituent unit (b) include styrene, o-methylstyrene, m-methylstyrene, p-methylstyrene, 2,5-dimethylstyrene, 2,4,6-trimethylstyrene, p-hydroxystyrene, methoxystyrene, ethoxystyrene, propoxystyrene, tert-butoxystyrene, chlorostyrene, and derivatives thereof. These can be used individually or in combination. Of these, preferred is styrene from the viewpoint of the cost of the production of the thermoplastic resin.

<Vinyl Monomer Forming Constituent Unit (c)>

Specific examples of vinyl monomers forming constituent unit (c) (or forming constituent unit (c')) include compounds represented by the following formula (6):

(6)

R4 is as defined for the formula (3) above, but, from the viewpoint of the copolymerizability during the production of the thermoplastic resin, R4 is especially preferably a phenyl group optionally having a hydrocarbon group.

Specific examples of vinyl monomers forming constituent unit (c) include α-methylstyrene and derivatives thereof. These can be used individually or in combination. Further, from the viewpoint of the cost of the production of the thermoplastic resin, the vinyl monomer is preferably α-methylstyrene.

<Other Monomers>

In the present invention, a monomer forming a constituent unit other than the above-mentioned constituent units (a) to (c) can be copolymerized in such an amount that the effects of the thermoplastic resin of the present invention are not sacrificed.

<Production of the Thermoplastic Resin>

(Copolymerization)

In the copolymerization of the above-described monomer components, a known method can be used, and a simple method using radical polymerization is advantageous from an industrial point of view. As a method using radical polymerization, a known method can be appropriately selected from, for example, a bulk polymerization method, a solution polymerization method, and a suspension polymerization method.

The bulk polymerization method is conducted by, for example, a method in which a monomer composition comprising the above-mentioned monomers and a polymerization initiator is continuously fed to a perfect mixing vessel and subjected to continuous polymerization at 100 to 180° C., or a method in which the monomer composition is fed to a reactor and subjected to batch polymerization at 100 to 180° C. The monomer composition may contain a chain transfer agent if necessary.

With respect to the above-mentioned polymerization initiator, any known initiators can be used, and specific examples of the initiators include organic peroxides, such as t-amyl peroxy-2-ethylhexanoate, t-butyl peroxy-2-ethylhexanoate, lauroyl peroxide, benzoyl peroxide, 1,1-di(t-hexylperoxy)-3,3,5-trimethylcyclohexane, 1,1-di(t-hexylperoxy)cyclohexane, 1,1-di(t-butylperoxy)cyclohexane, t-hexylperoxyisopropyl monocarbonate, t-amyl peroxynormaloctoate, t-butylperoxyisopropyl monocarbonate, di-t-butyl peroxide, and 2,2-bis(4,4-di-t-butylperoxycyclohexyl)propane. These can be used individually or in combination.

Examples of chain transfer agents used in the polymerization include α-methylstyrene dimer, terpinolene, and dipentene.

Examples of polymerization solvents used in the above-mentioned solution polymerization method include hydrocarbon solvents, such as toluene, ethylbenzene, xylene, cyclohexane, and methylcyclohexane; ester solvents, such as ethyl acetate and methyl isobutyrate; ketone solvents, such as acetone and methyl ethyl ketone; ether solvents, such as tetrahydrofuran and dioxane; and alcohol solvents, such as methanol and isopropanol.

In the thermoplastic resin of the present invention, the proportion of the constituent units is not always the same as the ratio of the charged monomers, and is determined by the amounts of the monomers actually incorporated into a resin during a polymerization reaction. When the rate of reaction of the monomers is 100%, the proportion of the constituent units in the resin is the same as the ratio of the charged monomers. However, actually, the rate of reaction is 100% or less. A monomer having a higher reactivity is more likely to be incorporated into a resin, causing a difference between the ratio of the charged monomers and the proportion of the constituent units in the resultant resin. Therefore, by multiplying the ratio of the charged monomers by a rate of reaction of each monomer, the proportion of the constituent units in the thermoplastic resin can be determined. The rate of reaction of each monomer can be indirectly determined by quantitative determination of the unreacted monomer after the copolymerization reaction. Quantitative determination of the monomer can be performed by a known method, such as gas chromatography.

Further, the percentage of the constituent units in the thermoplastic resin can be controlled by appropriately changing the amounts of the individual monomers charged.

After completion of the polymerization reaction, the resultant reaction mixture is withdrawn from the polymerization vessel, and the volatile component is removed from the mixture to obtain an aromatic copolymer resin. As a method for removing the volatile component, a known method, for example, using a devolatilizing extruder or a vacuum devolatilizing vessel can be used.

(Hydrogenation)

The thermoplastic resin of the present invention is obtained by obtaining the above-mentioned aromatic copolymer resin, and then hydrogenating the aromatic copolymer resin with respect to 70% or more of the benzene rings in constituent unit (b') and constituent unit (c'), which units are hydrogenated to form constituent unit (b) and constituent unit (c). When constituent unit (a') or a constituent unit derived from another monomer has benzene rings, these benzene rings are also hydrogenated.

From the viewpoint of achieving excellent heat resistance and thermal stability of the thermoplastic resin of the present invention, the rate of hydrogenation of the benzene rings is preferably 90% or more, more preferably 95% or more. As mentioned above, constituent units (b) and (c) improve the resin in heat resistance and thermal stability. Therefore, also by increasing the percentage of these constituent units, the resin is improved in the heat resistance and thermal stability. Particularly, constituent unit (c) remarkably improves the heat resistance. Further, when the number of benzene rings in the aromatic copolymer resin (the percentage of constituent units (b) and (c)) is large, the improvement of the heat resistance by hydrogenation is generally large.

In the thermoplastic resin of the present invention obtained through the above-mentioned hydrogenation reaction, as mentioned above, the weight percentage of constituent unit (a), based on the total weight of the all constituent units, is 60 to 85% by weight, preferably 60 to 80% by weight, further preferably 65 to 80% by weight, the weight percentage of constituent unit (b), based on the total weight of the all constituent units, is 5 to 30% by weight, preferably 7 to 28% by weight, and the weight percentage of constituent unit (c), based on the total weight of the all constituent units, is 5 to 15% by weight, preferably 10 to 15% by weight, and a constituent unit derived from another monomer may be present in such an amount that the effects of the present invention are not sacrificed (the sum of the amounts of the above constituent units is 100% by weight).

The thermoplastic resin of the present invention may be a random copolymer in which the constituent units are randomly arranged, or a block copolymer in which a block comprising certain constituent units is present.

In the molecules of the thermoplastic resin of the present invention, it is considered that there are present constituent units (b) and (c) in which all the double bonds of benzene rings (R3 in the formula (2) and R4 in the formula (3)) of the monomers forming the constituent units are hydrogenated (cyclohexyl group), those units in which part of the double bonds of benzene rings are hydrogenated (cyclohexadienyl group and cyclohexenyl group), and those units in which the double bonds of benzene rings are not hydrogenated (phenyl group).

Hydrogenating 70% or more of the benzene rings means that the proportion of the sum of the number of R3s which are a cyclohexadienyl group, a cyclohexenyl group, or a cyclohexyl group, each optionally having the substituent, and the number of R4s which are a cyclohexadienyl group, a cyclohexenyl group, or a cyclohexyl group, each optionally having the hydrocarbon group, to the total number of all R3s and R4s present in the all constituent units of the thermoplastic resin is 70% or more. When constituent unit (a') and a constituent unit derived from another monomer have benzene rings, the proportion of the sum of the numbers of R3s, R4s, and the benzene rings in the above constituent units, which are a cyclohexadienyl group, a cyclohexenyl group, or a cyclohexyl group, to the total number of all R3s and R4s and the above benzene rings in the all constituent units is 70% or more.

Further, the expression that the proportion of the sum of the numbers is 70% or more means that, for example, when 100 constituent units (b) are present, 70 or more R3s among the 100 R3s are a cyclohexadienyl group, a cyclohexenyl group, or a cyclohexyl group, but this is not always required to be met, and, with respect to R3 and R4, and constituent unit (a') and a constituent unit derived from another monomer, which have benzene rings before the hydrogenation, the proportion of the sum of the numbers of substituents, which are a cyclohexadienyl group, a cyclohexenyl group, or a cyclohexyl group, to the total number of all R3s and R4s and the above benzene rings in the all constituent units is 70% or more.

The rate of hydrogenation can be determined from a reduction ratio of the absorbance at 260 nm (corresponding to the absorption of a benzene ring) of the resin between before and after the hydrogenation reaction in a UV spectrum measurement.

The solvent used in the hydrogenation reaction may be the same as or different from the solvent for the above-mentioned polymerization, and specific examples of the solvents include hydrocarbon solvents, such as cyclohexane and methylcyclohexane; ester solvents, such as ethyl acetate and methyl isobutyrate; ketone solvents, such as acetone and methyl ethyl ketone; ether solvents, such as tetrahydrofuran and dioxane; and alcohol solvents, such as methanol and isopropanol.

With respect to the method for hydrogenation, there is no particular limitation, and a known method can be used. For example, the hydrogenation can be conducted in a batchwise manner or in a continuous flow manner under a hydrogen pressure of 3 to 30 MPa at a reaction temperature of 60 to 250° C. When the reaction temperature is 60° C. or higher, too long a reaction time is not required, and, when the reaction temperature is 250° C. or lower, cleavage of molecular chains or hydrogenation of an ester site (present in, for example, constituent unit (a)) can be suppressed.

Examples of catalysts used in the hydrogenation reaction include metals, such as nickel, palladium, platinum, cobalt, ruthenium, and rhodium, and oxides, salts, and complex compounds of the above metals, and further include solid catalysts comprising the above metal and a porous carrier, such as carbon, alumina, zirconium oxide, silica, silica-alumina, or diatomaceous earth, having the metal supported thereon.

After the hydrogenation, the resultant resin mixture is withdrawn from the reaction vessel, and the catalyst and volatile component are removed from the mixture to obtain the thermoplastic resin of the present invention. As a method for removing the volatile component, a known method, for example, using a devolatilizing extruder or a vacuum devolatilizing vessel can be used.

The method is described above in which an aromatic copolymer resin is first produced and then hydrogenated, but a method may be employed in which hydrogenation of benzene rings of a monomer is preliminarily performed and the resultant monomer is subjected to copolymerization (a polymerization reaction of a monomer having hydrogenated the benzene rings is known, and seen in, for example, Japanese Unexamined Patent Publication No. Sho 63-170475). In this method, constituent unit (a'), constituent unit (b'), and constituent unit (c') are not formed through the reaction. When a monomer is preliminarily subjected to hydrogenation, the reactivity of the monomer is reduced. Therefore, it is preferred that an aromatic copolymer resin is first produced and then hydrogenated.

[Properties and Application of the Thermoplastic Resin]
<Properties of the Thermoplastic Resin>

The thermoplastic resin of the present invention corresponds to the aromatic copolymer resin as an intermediate in the production thereof, which is hydrogenated with respect to 70% or more of the benzene rings in constituent unit (b') and constituent unit (c') (and constituent unit (a') and a constituent unit derived from another monomer, which units have benzene rings). That is, the percentage of the benzene rings remaining in these constituent units is 30% or less. When the percentage of the remaining benzene rings is more than 30%, the resultant resin is unsatisfactory in the heat resistance and thermal stability, and further poor in transparency. The percentage of the remaining benzene rings is preferably in the range of 10% or less, more preferably in the range of 5% or less.

The thermoplastic resin of the present invention preferably has a glass transition temperature (Tg) of 125 to 135° C. By virtue of having a Tg of 125 to 135° C., the thermoplastic resin has excellent heat resistance so that the resin is unlikely to be deformed or melted even when heated. In the present specification, Tg is determined using a differential scanning calorimeter. Specifically, the temperature of the thermoplastic resin is elevated from 30° C. to 200° C. at 10° C./min. in a flow of nitrogen at 30 ml/min., and then decreased from 200° C. to 30° C. at 50° C./min., and further elevated from 30° C. to 200° C. at 10° C./min., and the intermediate-point glass transition temperature in the second temperature elevation is determined as a Tg in the present specification.

The thermoplastic resin of the present invention preferably has a 5% weight loss temperature of 265° C. or higher. By virtue of having a 5% weight loss temperature of 265° C. or higher, the resin is unlikely to be decomposed even when heated, achieving excellent thermal stability and moldability. In the present specification, the 5% weight loss temperature is determined by a thermogravimetric analysis. Specifically, the temperature of the thermoplastic resin is elevated from room temperature to 500° C. at 10° C./min. in a flow of nitrogen at 100 ml/min., and a temperature at which the weight of the thermoplastic resin is reduced by 5% by weight is determined as a 5% weight loss temperature.

The thermoplastic resin of the present invention preferably has a saturation water absorption of 1.2% by weight or less, more preferably 1.0% by weight or less. By virtue of having a saturation water absorption of 1.2% by weight or less, the thermoplastic resin is unlikely to suffer a change in size or a change in refractive index due to absorption of water, and therefore can be used as a material suitable for various optical components. In the present specification, the saturation water absorption is a value measured in accordance with the method described in JIS K7209 A.

The thermoplastic resin of the present invention preferably has a pencil hardness of 2H or more. By virtue of having a pencil hardness of 2H or more, the thermoplastic resin has excellent surface hardness so that the resin exhibits excellent scratch resistance. In the present specification, the pencil hardness is a value measured in accordance with JIS K5600-5-4.

From the viewpoint of achieving excellent mechanical strength and moldability, the thermoplastic resin of the present invention preferably has a weight average molecular weight of 100,000 to 250,000, more preferably 110,000 to 230,000. When the weight average molecular weight of the thermoplastic resin is less than 100,000, it is likely that a shaped article formed from the thermoplastic resin is unsatisfactory in the mechanical strength, and, when the weight average molecular weight is 250,000 or more, it is likely that the resin has poor fluidity so that the resin exhibits unsatisfactory moldability, making it difficult to obtain an intended shaped article. In the present specification, the weight average molecular weight is a weight average molecular weight as measured by gel permeation chromatography (GPC), in which standard polystyrene is used for molecular weight calibration.

Further, the thermoplastic resin of the present invention has excellent transparency, and the total luminous transmittance of the thermoplastic resin is generally 90 to 93%. In the present specification, the total luminous transmittance is a value measured in accordance with JIS K7105 at an optical path length of 3.2 mm.

<Application of the Thermoplastic Resin>

The thermoplastic resin of the present invention having excellent heat resistance, excellent thermal stability, low water absorption properties, excellent surface hardness, and excellent mechanical strength as mentioned above can be used in the application of, for example, various types of optical components. Specific examples of the applications include an optical lens, a plastic lens, a light guide plate, a light guide, a light diffuser plate, a display front panel, an optical fiber, an optical filter, a prism, a transparent substrate material, a transparent protecting material, and an optical recording medium substrate.

For using the thermoplastic resin of the present invention in the above application, the thermoplastic resin is melted by heating and shaped into a desired shape. The shaping can be performed by a casting method in which the resin is dissolved in a solvent and cast to volatilize the solvent, a hot press molding method in which resin pellets are placed in a die in a plate form and heated and a pressure is applied to the die, an injection molding method, or an extrusion method.

The extrusion method has high productivity and hence has generally been widely used, and, in this method, the thermoplastic resin is melt-extruded into shapes suitable for various uses by a sheet extruder having a T-die (called also a flat die) fitted to a single-screw extruder or a twin-screw extruder.

The temperature of the resin being extruded is generally 200 to 300° C. When the temperature of the resin being extruded is in this range, the resin exhibits satisfactory fluidity such that the shape of the surface of the roll is transferred to the resin, and further such a temperature is unlikely to cause, for example, discoloration due to decomposition of the resin, a lowering of the resistance to heat deformation, or a poor working atmosphere due to an odor. From such a point of view, the temperature of the resin being extruded is further preferably 220 to 280° C.

Further, in the application of the thermoplastic resin of the present invention to various uses, if necessary, an additive can be mixed into the resin in such an amount that the above-mentioned physical properties of the thermoplastic resin are not sacrificed. Examples of such additives include an antioxidant, an ultraviolet light absorber, a fluorescent brightening agent, a light stabilizer, a discoloration resistive agent, an antistatic agent, a release agent, a lubricant, a dye, and a pigment. With respect to the method for mixing an additive into the resin, there is no particular limitation, and, for example, a method in which all the components are compounded, a method in which a masterbatch is dry-blended, or a method in which all the components are dry-blended can be used.

EXAMPLES

Hereinbelow, the present invention will be described with reference to the following Examples, which should not be construed as limiting the scope of the present invention.

The thermoplastic resins obtained in the Examples and Comparative Examples were individually evaluated as follows.

<Measurement of a Glass Transition Temperature>

A glass transition temperature was determined using a differential scanning calorimeter. The measurement was performed in a flow of nitrogen at 30 ml/min. First, the temperature of the thermoplastic resin was elevated from 30° C. to 200° C. at 10° C./min., and then decreased from 200° C. to 30° C. at 50° C./min. Finally, the temperature was elevated from 30° C. to 200° C. at 10° C./min. The intermediate-point glass transition temperature in the second temperature elevation was determined as a glass transition temperature of the thermoplastic resin. The heat resistance of the thermoplastic resin was evaluated by the glass transition temperature. The thermoplastic resin having a glass transition temperature of 125° C. or higher was acceptable.

<Measurement of a 5% Weight Loss Temperature>

A 5% weight loss temperature was determined by a thermogravimetric analysis. The temperature of 20 mg of a resin was elevated from room temperature to 500° C. at 10° C./min. in a flow of nitrogen at 100 ml/min. A temperature at which the weight of the resin was reduced by 5% by weight was determined as a 5% weight loss temperature, and the thermal stability of the thermoplastic resin was evaluated by the 5% weight loss temperature. The higher the 5% weight loss temperature, the higher the thermal stability. The thermoplastic resin having a 5% weight loss temperature of 265° C. or higher was acceptable.

<Measurement of a Saturation Water Absorption>

Using an injection molding machine (apparatus name: NP7-1F (manufactured by Nissei Plastic Industrial Co., Ltd.)), a test specimen having a thickness of 3.2 mm and a diameter of 50 mm was prepared. A saturation water absorption was measured in accordance with the method described in JIS K7209 A, and the water absorption properties of the thermoplastic resin were evaluated by the saturation water absorption. The lower the saturation water absorption, the more excellent the low water absorption properties. The specimen having a saturation water absorption of 1.2% or less was acceptable.

<Measurement of a Pencil Scratch Hardness>

Using an injection molding machine (apparatus name: NP7-1F (manufactured by Nissei Plastic Industrial Co., Ltd.)), a test specimen having a thickness of 3.2 mm and a diameter of 50 mm was prepared. In accordance with JIS K5600-5-4, a pencil was pressed against the surface of the specimen at an angle of 45 degrees with a load of 750 g, wherein the hardness of the pencil used was stepwise increased, and the hardness of the hardest pencil with which no scratch was caused in the surface was determined as a pencil hardness. The surface hardness of the thermoplastic resin was evaluated by the pencil hardness. The specimen having a pencil hardness of 2H or more was acceptable.

<Measurement of a Weight Average Molecular Weight>

A resin was dissolved in tetrahydrofuran so that the resin concentration became 0.2 wt %, and subjected to filtration using a 0.45 µm membrane filter, and the resultant filtrate was used as a sample. The sample was subjected to measurement of gel permeation chromatography (apparatus name: HLC-8320GPC (manufactured by Tosoh Corp.); solvent: tetrahydrofuran; column: TSK gel SuperHM-M (manufactured by Tosoh Corp.); temperature: 40° C.; flow rate: 0.6 mL/min.; detector: RI), and a weight average molecular weight was determined using standard polystyrene (trade name: PstQuickC (manufactured by Tosoh Corp.)) for molecular weight calibration. The mechanical strength of the thermoplastic resin was evaluated by the weight average molecular weight. The sample having a weight average molecular weight of 100,000 or more was acceptable.

<Overall Judgment>

The thermoplastic resin, which was acceptable with respect to all the above-mentioned glass transition temperature, 5% weight loss temperature, saturation water absorption, pencil hardness, and weight average molecular weight, was acceptable in respect of the overall judgment, and one which was unacceptable with respect to at least one of them was unacceptable in respect of the overall judgment.

Example 1

In a stainless steel autoclave was placed a monomer composition comprising, as monomer components, 61 parts by weight of methyl methacrylate (manufactured by Junsei Chemical Co., Ltd.), 22 parts by weight of styrene (manufactured by Junsei Chemical Co., Ltd.), and 17 parts by weight of α-methylstyrene (manufactured by Tokyo Chemical Industry Co., Ltd.), 0.29 part by weight of α-methylstyrene dimer (manufactured by Tokyo Chemical Industry Co., Ltd.) as a chain transfer agent, and 0.47 part by weight of PERTETRA A (manufactured by NOF Corporation) as a polymerization initiator, and the autoclave was purged with nitrogen and sealed up.

The autoclave was heated to 40° C., and then the temperature was elevated to 120° C. at 2° C./min. and maintained at 120° C., and, after 5 hours from the start of temperature elevation, the polymerization reaction was terminated. A part of the resultant resin/monomer mixture was diluted with toluene in a 10-fold amount, and cyclohexanone as an internal standard in an amount of 0.67% by weight was added thereto, and the resultant mixture was subjected to measurement of the individual monomer contents by a gas chromatography (GC) equipped with a hydrogen flame ionization detector.

The remaining resin/monomer mixture was diluted with toluene in a 7-fold amount, and the resultant mixture was added dropwise to methanol in a 10-fold amount to perform reprecipitation. The resultant precipitates were collected by filtration and dried to obtain methyl methacrylate/styrene/α-methylstyrene copolymer resin (A1'). The result of calculation of the composition of resin (A1') from the individual monomer contents measured by GC showed that: methyl methacrylate: 62% by weight, styrene: 25% by weight, and α-methylstyrene: 13% by weight.

Subsequently, resin (A1') was dissolved in methyl isobutyrate (IBM) to prepare a 10% by weight IBM solution. In a stainless steel autoclave were charged 5 parts by weight of the 10% by weight IBM solution of resin (A1') and 0.01 part by weight of a 10% by weight Pd/C catalyst (manufactured by N. E. CHEMCAT CORPORATION), and, while stirring, the resultant mixture was maintained under a hydrogen pressure of 9 MPa at 180° C. for 15 hours, hydrogenating the benzene ring sites of resin (A1'). The hydrogenation catalyst was removed by filtration, and the resultant solution was added dropwise to methanol in a 20-fold amount to perform reprecipitation, followed by filtration and drying, to obtain resin (A1). Further, the result of the measurement of an absorbance at a wavelength of 260 nm showed that the rate of hydrogenation reaction (hydrogenation reaction rate) of the benzene ring sites was 97%.

Resin (A1) had a glass transition temperature of 131° C., which was acceptable, a 5% weight loss temperature of 277° C., which was acceptable, a saturation water absorption of 0.5%, which was acceptable, a pencil hardness of 3H, which was acceptable, and a weight average molecular weight of 124,000, which was acceptable, and resin (A1) was acceptable in respect of the overall judgment.

Example 2

Methyl methacrylate/styrene/α-methylstyrene copolymer resin (A2') was obtained in substantially the same manner as in Example 1 except that, as monomer components, 63 parts by weight of methyl methacrylate, 26 parts by weight of styrene, and 11 parts by weight of α-methylstyrene were used. The result of calculation of the composition of resin (A2') showed that: methyl methacrylate: 64% by weight, styrene: 28% by weight, and α-methylstyrene: 8% by weight.

Hydrogenation of the benzene ring sites was conducted in substantially the same manner as in Example 1, except that resin (A2') was used instead of resin (A1'), to obtain resin (A2). Further, the result of the measurement of an absorbance at a wavelength of 260 nm showed that the hydrogenation reaction rate of the benzene ring sites was 99%.

Resin (A2) had a glass transition temperature of 128° C., which was acceptable, a 5% weight loss temperature of 276° C., which was acceptable, a saturation water absorption of 0.5%, which was acceptable, a pencil hardness of 2H, which was acceptable, and a weight average molecular weight of 139,000, which was acceptable, and resin (A2) was acceptable in respect of the overall judgment.

Example 3

Methyl methacrylate/styrene/α-methylstyrene copolymer resin (A3') was obtained in substantially the same manner as in Example 1 except that, as monomer components, 76 parts by weight of methyl methacrylate, 8 parts by weight of styrene, and 16 parts by weight of α-methylstyrene were used. The result of calculation of the composition of resin (A3') showed that: methyl methacrylate: 78% by weight, styrene: 10% by weight, and α-methylstyrene: 12% by weight.

Hydrogenation of the benzene ring sites was conducted in substantially the same manner as in Example 1, except that resin (A3') was used instead of resin (A1'), to obtain resin (A3). Further, the result of the measurement of an absorbance at a wavelength of 260 nm showed that the hydrogenation reaction rate of the benzene ring sites was 99%. Resin (A3) had a glass transition temperature of 129° C., which was acceptable, a 5% weight loss temperature of 267° C., which was acceptable, a saturation water absorption of 0.9%, which was acceptable, a pencil hardness of 4H, which was acceptable, and a weight average molecular weight of 119,000, which was acceptable, and resin (A3) was acceptable in respect of the overall judgment.

Example 4

Methyl methacrylate/styrene/α-methylstyrene copolymer resin (A4') was obtained in substantially the same manner as in Example 1 except that, as monomer components, 77 parts by weight of methyl methacrylate, 16 parts by weight of styrene, and 7 parts by weight of α-methylstyrene were used, and that the polymerization reaction was terminated after 2 hours from the start of temperature elevation. The result of calculation of the composition of resin (A4') showed that: methyl methacrylate: 75% by weight, styrene: 19% by weight, and α-methylstyrene: 6% by weight.

Hydrogenation of the benzene ring sites was conducted in substantially the same manner as in Example 1, except that resin (A4') was used instead of resin (A1'), to obtain resin (A4). Further, the result of the measurement of an absorbance at a wavelength of 260 nm showed that the hydrogenation reaction rate of the benzene ring sites was 97%. Resin (A4) had a glass transition temperature of 126° C., which was acceptable, a 5% weight loss temperature of 275° C., which was acceptable, a saturation water absorption of 0.9%, which was acceptable, a pencil hardness of 3H, which was acceptable, and a weight average molecular weight of 129,000, which was acceptable, and resin (A4) was acceptable in respect of the overall judgment.

Comparative Example 1

Methyl methacrylate/styrene/α-methylstyrene copolymer resin (A5') was obtained in substantially the same manner as in Example 1 except that, as monomer components, 42 parts by weight of methyl methacrylate, 40 parts by weight of styrene, and 18 parts by weight of α-methylstyrene were used. The result of calculation of the composition of resin (A5') showed that: methyl methacrylate: 46% by weight, styrene: 41% by weight, and α-methylstyrene: 13% by weight. Resin (A5') had a saturation water absorption of 0.4%, which was acceptable, and a weight average molecular weight of 140,000, which was acceptable, but had a glass transition temperature of 115° C., which was unacceptable, a 5% weight loss temperature of 260° C., which was unacceptable, and a pencil hardness of H, which was unacceptable, and resin (A5') was unacceptable in respect of the overall judgment.

Comparative Example 2

Hydrogenation of the benzene ring sites was conducted in substantially the same manner as in Example 1, except that resin (A5') obtained in Comparative Example 1 was used instead of resin (A1'), to obtain resin (A5). Further, the result of the measurement of an absorbance at a wavelength of 260 nm showed that the hydrogenation reaction rate of the benzene ring sites was 99%. Resin (A5) had a glass transition temperature of 135° C., which was acceptable, a 5% weight loss temperature of 279° C., which was acceptable, a saturation water absorption of 0.4%, which was acceptable, and a weight average molecular weight of 121,000, which was acceptable, but had a pencil hardness of H, which was unacceptable, and resin (A5) was unacceptable in respect of the overall judgment.

Comparative Example 3

Resin (A1') obtained in Example 1 had a saturation water absorption of 0.5%, which was acceptable, a pencil hardness of 3H, which was acceptable, and a weight average molecular weight of 136,000, which was acceptable, but had a glass transition temperature of 120° C., which was unacceptable, and a 5% weight loss temperature of 244° C., which was unacceptable, and resin (A1') was unacceptable in respect of the overall judgment.

Comparative Example 4

Resin (A2') obtained in Example 2 had a saturation water absorption of 0.5%, which was acceptable, a pencil hardness of 2H, which was acceptable, and a weight average molecular weight of 145,000, which was acceptable, but had a glass transition temperature of 117° C., which was unacceptable, and a 5% weight loss temperature of 244° C., which was unacceptable, and resin (A2') was unacceptable in respect of the overall judgment.

Comparative Example 5

As methyl methacrylate/styrene copolymer resin (B1'), ESTYRENE MS600 (manufactured by Nippon Steel & Sumikin Chemical Co., Ltd.) was used. The composition of resin (B1') was that: methyl methacrylate: 63% by weight, and styrene: 37% by weight. Resin (B1') had a saturation water absorption of 0.5%, which was acceptable, a pencil hardness of 2H, which was acceptable, and a weight average molecular weight of 147,000, which was acceptable, but had a glass transition temperature of 102° C., which was unacceptable, and a 5% weight loss temperature of 263° C., which was unacceptable, and resin (B1') was unacceptable in respect of the overall judgment.

Comparative Example 6

Hydrogenation of the benzene ring sites was conducted in substantially the same manner as in Example 1, except that resin (B1') in Comparative Example 5 was used instead of resin (A1'), to obtain resin (B1). Further, the result of the measurement of an absorbance at a wavelength of 260 nm showed that the hydrogenation reaction rate of the benzene ring sites was 99%. Resin (B1) had a 5% weight loss temperature of 280° C., which was acceptable, a saturation water absorption of 0.5%, which was acceptable, a pencil hardness of 2H, which was acceptable, and a weight average molecular weight of 147,000, which was acceptable, but had a glass transition temperature of 120° C., which was unacceptable, and resin (B1) was unacceptable in respect of the overall judgment.

Comparative Example 7

Methyl methacrylate/α-methylstyrene copolymer resin (C1') was obtained in substantially the same manner as in Example 1 except that, as monomer components, 51 parts by weight of methyl methacrylate and 49 parts by weight of α-methylstyrene were used. The result of calculation of the composition of resin (C1') showed that: methyl methacrylate: 75% by weight, and α-methylstyrene: 25% by weight. Resin (C1') had a glass transition temperature of 140° C., which was acceptable, a pencil hardness of 3H, which was acceptable, and a saturation water absorption of 0.9%, which was acceptable, but had a 5% weight loss temperature of 246° C., which was unacceptable. The polymerization reaction was unlikely to proceed so that the weight average molecular weight was as low as 35,000, which was unacceptable, and resin (C1') was unacceptable in respect of the overall judgment.

Comparative Example 8

Methyl methacrylate/styrene/α-methylstyrene copolymer resin (A6') was obtained in substantially the same manner as in Example 1 except that, as monomer components, 71 parts by weight of methyl methacrylate, 4 parts by weight of styrene, and 25 parts by weight of α-methylstyrene were used. The result of calculation of the composition of resin (A6') showed that: methyl methacrylate: 75% by weight, styrene: 6% by weight, and α-methylstyrene: 19% by weight. Resin (A6') had a glass transition temperature of 137° C., which was acceptable, a saturation water absorption of 0.9%, which was acceptable, and a pencil hardness of 3H, which was acceptable, but had a 5% weight loss temperature of 228° C., which was unacceptable, and a weight average molecular weight of 99,000, which was unacceptable, and resin (A6') was unacceptable in respect of the overall judgment.

Comparative Example 9

Hydrogenation of the benzene ring sites was conducted in substantially the same manner as in Example 1, except that resin (A6') obtained in Comparative Example 8 was used instead of resin (A1'), to obtain resin (A6). Further, the result of the measurement of an absorbance at a wavelength of 260 nm showed that the hydrogenation reaction rate of the benzene ring sites was 98%. Resin (A6) had a glass transition temperature of 131° C., which was acceptable, a saturation water absorption of 0.9%, which was acceptable, and a pencil hardness of 3H, which was acceptable, but had a 5% weight loss temperature of 264° C., which was unacceptable, and a weight average molecular weight of 68,000, which was unacceptable, and resin (A6) was unacceptable in respect of the overall judgment.

Comparative Example 10

Resin (A3') obtained in Example 3 had a saturation water absorption of 0.9%, which was acceptable, a pencil hardness of 3H, which was acceptable, and a weight average molecular weight of 125,000, which was acceptable, but had a glass transition temperature of 123° C., which was unacceptable, and a 5% weight loss temperature of 239° C., which was unacceptable, and resin (A3') was unacceptable in respect of the overall judgment.

Comparative Example 11

Resin (A4') obtained in Example 4 had a saturation water absorption of 0.9%, which was acceptable, a pencil hardness of 3H, which was acceptable, and a weight average molecular weight of 135,000, which was acceptable, but had a glass transition temperature of 116° C., which was unacceptable, and a 5% weight loss temperature of 240° C., which was unacceptable, and resin (A4') was unacceptable in respect of the overall judgment.

Comparative Example 12

As methyl methacrylate/styrene copolymer resin (B2'), ESTYRENE MS750 (manufactured by Nippon Steel & Sumikin Chemical Co., Ltd.) was used. The composition of resin (B2') was that: methyl methacrylate: 75% by weight, and styrene: 25% by weight. Resin (B2') had a saturation water absorption of 0.9%, which was acceptable, a pencil hardness of 3H, which was acceptable, and a weight average molecular weight of 122,000, which was acceptable, but had a glass transition temperature of 106° C., which was unacceptable, and a 5% weight loss temperature of 248° C., which was unacceptable, and resin (B2') was unacceptable in respect of the overall judgment.

Comparative Example 13

Hydrogenation of the benzene ring sites was conducted in substantially the same manner as in Example 1, except that resin (B2') in Comparative Example 12 was used instead of resin (A1'), to obtain resin (B2). Further, the result of the measurement of an absorbance at a wavelength of 260 nm showed that the hydrogenation reaction rate of the benzene ring sites was 99%. Resin (B2) had a 5% weight loss temperature of 278° C., which was acceptable, a saturation water absorption of 0.9%, which was acceptable, a pencil hardness of 3H, which was acceptable, and a weight average molecular weight of 121,000, which was acceptable, but had a glass transition temperature of 120° C., which was unacceptable, and resin (B2) was unacceptable in respect of the overall judgment.

Comparative Example 14

Methyl methacrylate/styrene/α-methylstyrene copolymer resin (A7') was obtained in substantially the same manner as in Example 1 except that, as monomer components, 90 parts by weight of methyl methacrylate, 4 parts by weight of styrene, and 6 parts by weight of α-methylstyrene were used. The result of calculation of the composition of resin (A7') showed that: methyl methacrylate: 90% by weight, styrene: 5% by weight, and α-methylstyrene: 5% by weight. Resin (A7') had a pencil hardness of 4H, which was acceptable, and a weight average molecular weight of 130,000, which was acceptable, but had a glass transition temperature of 109° C., which was unacceptable, a 5% weight loss temperature of 260° C., which was unacceptable, and a saturation water absorption of 1.7%, which was unacceptable, and resin (A7') was unacceptable in respect of the overall judgment.

Comparative Example 15

Hydrogenation of the benzene ring sites was conducted in substantially the same manner as in Example 1, except that resin (A7') obtained in Comparative Example 14 was used instead of resin (A1'), to obtain resin (A7). Further, the result of the measurement of an absorbance at a wavelength of 260 nm showed that the hydrogenation reaction rate of the benzene ring sites was 99%. Resin (A7) had a 5% weight loss temperature of 278° C., which was acceptable, a pencil hardness of 4H, which was acceptable, and a weight average molecular weight of 128,000, which was acceptable, but had a glass transition temperature of 116° C., which was unacceptable, and a saturation water absorption of 1.7%, which was unacceptable, and resin (A7) was unacceptable in respect of the overall judgment.

The results of the above evaluations are shown in Table 1 below. As apparent from Table 1, the thermoplastic resin of the present invention has excellent heat resistance, excellent thermal stability, low water absorption properties, excellent surface hardness, and excellent mechanical strength.

TABLE 1

| | | Resin composition before hydrogenation (wt %) | | | Hydrogenation reaction rate (%) | Weight average molecular weight | Glass transition temperature | 5% Weight loss temperature | Pencil hardness | Saturation water absorption | Overall judgment |
|---|---|---|---|---|---|---|---|---|---|---|---|
| | Resin | Methyl methacrylate | Styrene | α-Methyl styrene | | | | | | | |
| Example 1 | (A1) | 62 | 25 | 13 | 97 | ○ 124,000 | ○ 131° C. | ○ 277° C. | ○ 3H | ○ 0.5% | ○ |
| Example 2 | (A2) | 64 | 28 | 8 | 99 | ○ 139,000 | ○ 128° C. | ○ 276° C. | ○ 2H | ○ 0.5% | ○ |
| Example 3 | (A3) | 78 | 10 | 12 | 99 | ○ 119,000 | ○ 129° C. | ○ 267° C. | ○ 4H | ○ 0.9% | ○ |
| Example 4 | (A4) | 75 | 19 | 6 | 97 | ○ 129,000 | ○ 126° C. | ○ 275° C. | ○ 3H | ○ 0.9% | ○ |
| Comparative Example 1 | (A5') | 46 | 41 | 13 | 0 | ○ 140,000 | X 115° C. | X 260° C. | X H | ○ 0.4% | X |
| Comparative Example 2 | (A5) | 46 | 41 | 13 | 99 | ○ 121,000 | ○ 135° C. | ○ 279° C. | X H | ○ 0.4% | X |
| Comparative Example 3 | (A1') | 62 | 25 | 13 | 0 | ○ 136,000 | X 120° C. | X 244° C. | ○ 3H | ○ 0.5% | X |
| Comparative Example 4 | (A2') | 64 | 28 | 8 | 0 | ○ 145,000 | X 117° C. | X 244° C. | ○ 2H | ○ 0.5% | X |
| Comparative Example 5 | (B1') | 63 | 37 | 0 | 0 | ○ 147,000 | X 102° C. | X 263° C. | ○ 2H | ○ 0.5% | X |
| Comparative Example 6 | (B1) | 63 | 37 | 0 | 99 | ○ 147,000 | X 120° C. | ○ 280° C. | ○ 2H | ○ 0.5% | X |
| Comparative Example 7 | (C1') | 75 | 0 | 25 | 0 | X 35,000 | ○ 140° C. | X 246° C. | ○ 3H | ○ 0.9% | X |
| Comparative Example 8 | (A6') | 75 | 6 | 19 | 0 | X 99,000 | ○ 137° C. | X 228° C. | ○ 3H | ○ 0.9% | X |
| Comparative Example 9 | (A6) | 75 | 6 | 19 | 98 | X 68,000 | ○ 131° C. | X 264° C. | ○ 3H | ○ 0.9% | X |
| Comparative Example 10 | (A3') | 78 | 10 | 12 | 0 | ○ 125,000 | X 123° C. | X 239° C. | ○ 3H | ○ 0.9% | X |
| Comparative Example 11 | (A4') | 75 | 19 | 6 | 0 | ○ 135,000 | X 116° C. | X 240° C. | ○ 3H | ○ 0.9% | X |
| Comparative Example 12 | (B2') | 75 | 25 | 0 | 0 | ○ 122,000 | X 106° C. | X 248° C. | ○ 3H | ○ 0.9% | X |

TABLE 1-continued

| | Resin | Resin composition before hydrogenation (wt %) | | | Hydrogenation reaction rate (%) | Weight average molecular weight | Glass transition temperature | 5% Weight loss temperature | Pencil hardness | Saturation water absorption | Overall judgment |
|---|---|---|---|---|---|---|---|---|---|---|---|
| | | Methyl methacrylate | Styrene | α-Methyl styrene | | | | | | | |
| Comparative Example 13 | (B2) | 75 | 25 | 0 | 99 | ○ 121,000 | X 120° C. | ○ 278° C. | 3H | ○ 0.9% | X |
| Comparative Example 14 | (A7') | 90 | 5 | 5 | 0 | ○ 130,000 | X 109° C. | X 260° C. | 4H | X 1.7% | X |
| Comparative Example 15 | (A7) | 90 | 5 | 5 | 99 | ○ 128,000 | X 116° C. | ○ 278° C. | 4H | X 1.7% | X |

○: Acceptable,
X: Unacceptable

INDUSTRIAL APPLICABILITY

The thermoplastic resin of the present invention has excellent heat resistance, excellent thermal stability, low water absorption properties, excellent surface hardness, and excellent mechanical strength, and is advantageously used in the application of various types of optical components, such as an optical lens, a plastic lens, a light guide plate, a light guide, a light diffuser plate, a display front panel, an optical fiber, an optical filter, a prism, a transparent substrate material, a transparent protecting material, and an optical recording medium substrate.

The invention claimed is:

1. A thermoplastic resin comprising:
a constituent unit (a) that is derived from a (meth)acrylate monomer and represented by the following formula (1):

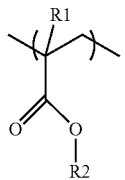
(1)

wherein, in the formula (1), R1 represents a hydrogen atom or a methyl group, and R2 represents a hydrocarbon group having 1 to 18 carbon atoms and optionally having a hydroxyl group or an alkoxy group, and when a plurality of the constituent units (a) are present, a plurality of R1s and a plurality of R2s are the same or different;
a constituent unit (b) that is derived from a vinyl monomer and represented by the following formula (2):

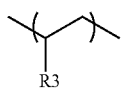
(2)

wherein, in the formula (2), R3 represents a phenyl group, a cyclohexadienyl group, a cyclohexenyl group, or a cyclohexyl group, each of which optionally has at least one substituent selected from the group consisting of a hydrocarbon group having 1 to 4 carbon atoms, a hydroxyl group, an alkoxy group, and a halogen atom, and when a plurality of the constituent units (b) are present, a plurality of R3s are the same or different; and a constituent unit (c) that is derived from a vinyl monomer and represented by the following formula (3):

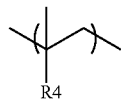
(3)

wherein, in the formula (3), R4 represents a phenyl group, a cyclohexadienyl group, a cyclohexenyl group, or a cyclohexyl group, each of which optionally has a hydrocarbon group having 1 to 4 carbon atoms, and when a plurality of the constituent units (c) are present, a plurality of R4s are the same or different, wherein the proportion of the sum of the number of R3s which are a cyclohexadienyl group, a cyclohexenyl group, or a cyclohexyl group, each optionally having the substituent, and the number of R4s which are a cyclohexadienyl group, a cyclohexenyl group, or a cyclohexyl group, each optionally having the hydrocarbon group, to the total number of all R3s and R4s present in the all constituent units of the thermoplastic resin is 70% or more, and the weight percentage of the constituent unit (a), based on the total weight of the all constituent units, is 60 to 85% by weight, the weight percentage of the constituent unit (b), based on the total weight of the all constituent units, is 5 to 30% by weight, and the weight percentage of the constituent unit (c), based on the total weight of the all constituent units, is 5 to 15% by weight.

2. The thermoplastic resin according to claim 1, wherein the weight percentage of the constituent unit (a), based on the total weight of the all constituent units, is 60 to 80% by weight, the weight percentage of the constituent unit (b), based on the total weight of the all constituent units, is 7 to 28% by weight, and the weight percentage of the constituent unit (c), based on the total weight of the all constituent units, is 10 to 15% by weight.

3. The thermoplastic resin according to claim 1, wherein, in the formula (1), each of R1 and R2 is a methyl group.

4. The thermoplastic resin according to claim 1, wherein, in the formula (2), R3 is a phenyl group, a cyclohexadienyl group, a cyclohexenyl group, or a cyclohexyl group.

5. The thermoplastic resin according to claim 1, wherein, in the formula (3), R4 is a phenyl group, a cyclohexadienyl group, a cyclohexenyl group, or a cyclohexyl group.

6. The thermoplastic resin according to claim 1, which has a glass transition temperature of 125 to 135° C., as determined using a differential scanning calorimeter.

7. The thermoplastic resin according to claim 1, which has a weight average molecular weight of 100,000 to 250,000.

8. An optical component comprising the thermoplastic resin according to claim 1.

* * * * *